(12) United States Patent
Abel et al.

(10) Patent No.: US 12,012,486 B2
(45) Date of Patent: Jun. 18, 2024

(54) SYSTEM AND METHOD FOR A SEMI-CONTINUOUS PROCESS FOR PRODUCING POLYSILAZANES

(71) Applicant: A/G INNOVATION PARTNERS, LTD., Powell, OH (US)

(72) Inventors: Albert Abel, Powell, OH (US); Gary J. Knasiak, Coatesville, PA (US)

(73) Assignee: A/G INNOVATION PARTNERS, LTD., Powell, OH (US)

( * ) Notice: Subject to any disclaimer, the term of this patent is extended or adjusted under 35 U.S.C. 154(b) by 778 days.

(21) Appl. No.: 17/262,274

(22) PCT Filed: Jul. 24, 2019

(86) PCT No.: PCT/US2019/043139
§ 371 (c)(1),
(2) Date: Jan. 22, 2021

(87) PCT Pub. No.: WO2020/023572
PCT Pub. Date: Jan. 30, 2020

(65) Prior Publication Data
US 2021/0317272 A1 Oct. 14, 2021

Related U.S. Application Data

(60) Provisional application No. 62/702,505, filed on Jul. 24, 2018.

(51) Int. Cl.
| *B01J 19/00* | (2006.01) |
| *B01D 53/96* | (2006.01) |
| *B01J 19/06* | (2006.01) |
| *B01J 19/24* | (2006.01) |
| *C08G 77/62* | (2006.01) |

(52) U.S. Cl.
CPC ........... *C08G 77/62* (2013.01); *B01D 53/96* (2013.01); *B01J 19/0013* (2013.01); *B01J 19/06* (2013.01); *B01J 19/24* (2013.01); *B01J 2219/00031* (2013.01); *B01J 2219/0009* (2013.01)

(58) Field of Classification Search
CPC ................. C08G 77/62; C08J 11/02
See application file for complete search history.

(56) References Cited

U.S. PATENT DOCUMENTS

| 6,329,487 | B1 * | 12/2001 | Abel | ........................ | C07F 7/21 |
| | | | | | 556/412 |
| 6,652,978 | B2 | 11/2003 | Lukacs, III | | |
| 6,756,469 | B2 | 6/2004 | Lukacs, III | | |
| 7,033,562 | B2 | 4/2006 | Knasiak | | |
| 2004/0076573 | A1 * | 4/2004 | Knasiak | .................. | C01C 1/026 |
| | | | | | 423/356 |
| 2010/0210808 | A1 | 8/2010 | Jeong | | |
| 2015/0147256 | A1 | 5/2015 | Hoppe et al. | | |
| 2015/0307354 | A1 | 10/2015 | Hoppe | | |

FOREIGN PATENT DOCUMENTS

| CN | 109627446 A | * | 4/2019 |
| WO | WO 2018/164709 A1 | * | 9/2018 |

* cited by examiner

*Primary Examiner* — Marc S Zimmer
(74) *Attorney, Agent, or Firm* — Casimir Jones, SC; Marianne Fuierer (57) ABSTRACT

The present invention provides for a system comprising a static reactor vessel which requires no moving parts, and adapted for precise control of reaction processing parameters including temperature, pressure, and flow rate; a mechanism for settling of the product phase from the salt ammonia phase and removing a significant portion of the ammonium chloride waste material; a method for recovering essentially all of the process ammonia and a method for maintaining a reaction environment which is suitably ionic/acidic.

18 Claims, 3 Drawing Sheets

SYSTEM AND METHOD FOR A SEMI-CONTINUOUS PROCESS FOR PRODUCING POLYSILAZANES

CROSS-REFERENCE TO RELATED APPLICATIONS

This application is filed under the provisions of 35 U.S.C. § 371 and claims the priority of International Patent Application No. PCT/US2019/043139 filed on Jul. 24, 2019 which in turn claims priority to U.S. Provisional Application No. 62/702,505, filed on Jul. 24, 2018, the contents of all is hereby incorporated by reference herein for all purposes.

FIELD OF THE INVENTION

The present invention provides for a system and method for producing polysilazanes with a simplified ammonia recovery and improved salt removal process.

BACKGROUND OF THE INVENTION

Related Art

Silazanes, which have a Si—N—Si bond configuration, are increasingly important because they can be pyrolyzed to yield ceramic materials, such as silicon carbide and silicon nitride. Silazanes are usually synthesized by an ammonolysis process wherein ammonia or a primary amine is reacted with a halide substituted silane. The ammonolysis of organo-halosilanes is a complex process consisting of several concurrent reactions as shown below. The formula below shows no structural implication but instead a general formulation to illustrate the reaction:

$$\mathrm{Si-X + 2NH_3 \rightarrow -Si-NH_2 + NH_4X}$$

wherein X is a halogen.

As presently employed, polysilazane ammonolysis is a batch process in which a limited quantity of chlorosilane is injected into anhydrous liquid ammonia. One major factor defines the process as a batch process, the exothermic nature of the ammonolysis reaction which can range between 2,600 to 4,400 btu/pound of product. The heat build-up, if not addressed, can result in serious over-pressurization of the reactor and can result in ammonia being forced back into the chlorosilane supply tank with explosive consequences.

Best current practice starts with the introduction of chilled (−10° C.) anhydrous ammonia into the reactor, followed by short bursts of chlorosilane until the mixture reaches approximately 30° C. and the system pressure approaches 130 to 140 psi. Then the system is cooled by the controlled release of ammonia vapor (auto-refrigeration) and the pressure drops to 70-80 psi and the process can be repeated.

When the chlorosilane addition is complete, the contents of the reactor are allowed to settle, either in the reactor or in a separate settling vessel, and then the polysilazane resin is decanted into a collection container for subsequent outgassing and polish filtering. The remaining ammonium chloride/ammonia slurry is processed to separate the ammonia salt for recovery or disposal. Some operations simply inject ammonia and salt into water and send the resulting brine for outside disposal. Other operations collect the ammonia by evaporation/condensation for subsequent reuse and the ammonium chloride salts are sent to separate disposal.

It is not easy to assess the potential value of the polysilazane-related market. One primary reason is that although applications for the material are valued in the billions of dollars, the continuing high cost of polysilazane resins has dampened development of many product arenas. Further, the sole U.S. distributor recently announced a 20% increase in the price of KiON polysilazanes.

Thus, it would be advantageous to develop an improved manufacturing process to overcome the high costs of manufacturing and address the problem of separating the polysilazane resin from the ammonia and waste ammonium halide salt both of which are currently a significant barrier to efficient production. As such, there is a need for a more cost efficient and simplified method for production of polysilazanes and removal of the ammonia and waste ammonium halide from the process.

SUMMARY OF THE INVENTION

The present invention provides for a system comprising a static reactor vessel which requires no moving parts, and adapted for precise control of reaction processing parameters including temperature, pressure, and flow rate; a mechanism for settling of the product phase from the salt ammonia phase and removing a significant portion of the ammonium chloride waste material; and a method for recovering essentially all of the process ammonia and a method for maintaining a reaction environment which is suitably ionic/acidic.

The silazanes and/or polysilazanes of the present invention can be prepared by the methods described herein. Specifically, at least one halosilane, preferably having at least one Si—H bond, is introduced into at least twice the stoichiometric amount of liquid anhydrous ammonia relative to silicon-halide bonds, and preferably at least from about five to about ten times. The anhydrous ammonia is maintained at a sufficient temperature and/or pressure to remain liquefied during the process. During the ammonolysis process ammonium halide salt created as a co-product during ammonolysis is retained in the anhydrous liquid ammonia solution. The ammonium halide salt is substantially ionized and solubilized in the anhydrous liquid ammonia, and as such, provides an acidic environment for catalytically preparing the novel silazane and polysilazane compounds of the present invention.

It is theorized that a Si—H bond in contact with the solubilized and ionized ammonium halide salt, acting as a nonmetallic acid catalyst, is catalytically cleaved by the active ammonium halide salt thereby generating a new silicon-halogen bond on the linear chain of the polymer. The newly generated silicon-halogen bond provides an active site for further ammonolysis. Ammonolysis may continue until all Si—H bonds are cleaved and newly formed silicon-halogen bonds are ammonolysized. Further polymerization may include dimerization of linear polymers to a mixture of four, six, eight or more membered fused cyclic structures In one aspect the present invention provides for an ammonolysis reactor system for producing polysilazanes and subsequent removal of unused ammonia and ammonium halide salt, the ammonolysis reactor system comprising:
a) a static reactor vessel for introducing ammonia and at least one Si—H starting compound, wherein the static reactor vessel is a static mixer enclosed in a jacket to maintain an optimal temperature and pressure for the ammonolysis reaction;
b) a settling vessel communicatively connected to the static reaction vessel having an inlet for receiving an input of unused ammonia, ammonium halide salt and produced ammonolysis product, wherein the produced ammonolysis product settles to a lower layer in the settling vessel for removal thereof; and c) a separation vessel communicatively connected to the settling vessel having an inlet for introducing an ammonium halide salt/ammonia solution and an outer surface, wherein at least a section of the outer surface of the separation vessel is enclosed and/or in contact with heating and cooling coils to provide temperature changes from about −10° C. to about 80° C., wherein the waste ammonium halide salt is precipitated and ammonia is removed from the separation vessel at a temperature of about −10° C.

The above ammonolysis reaction system may further comprise a capture vessel communicatively connected to both the separation vessel and static reaction vessel for receiving ammonia removed from the separation vessel wherein the temperature within the capture vessel is about −10° C. and recovered ammonia can be reused in the ammonolysis process in the static reaction vessel.

In yet another aspect, the present invention provides for a semi-continuous method of producing polysilazanes and separating same from unused ammonia and a waste salt product, the method comprising:

a) providing a ammonolysis reactor system comprising
   i) a static reactor vessel for introducing ammonia and at least one Si—H starting compound, wherein the static reactor vessel is a static mixer enclosed in a jacket to maintain an optimal temperature and pressure for the ammonolysis reaction;
   ii) a settling vessel communicatively connected to the static reaction vessel having an inlet for receiving an input of unused ammonia, ammonium halide salt and produced ammonolysis product, wherein the settling vessel is temperature control thereby allowing the produced ammonolysis product to settle to a lower layer in the settling vessel for removal thereof; and
   iii) a separation vessel communicatively connected to the settling vessel having an inlet for introducing an ammonium halide salt/ammonia solution and an outer surface, wherein at least a section of the outer surface is enclosed and/or in contact with heating and cooling coils to provide temperature changes from about −10° C. to about 80° C., wherein ammonium halide salt is precipitated and ammonia is removed from the separation vessel at a temperature of about −10 C;

b) introducing ammonia and at least one Si—H starting compound into the static reaction vessel and maintaining the optimal temperature and pressure for the production of polysilazanes;

c) moving the produced polysilazanes, unused ammonia and ammonium halide salt products from the static reaction vessel and to the settling vessel;

d) adjusting the temperature in the settling vessel for settling of the produced polysilazanes to a layer separate from that of the unused ammonia and ammonium halide salt product;

e) removing the unused ammonia and ammonium halide salt product from the settling vessel and introducing into the separation vessel, wherein the temperature in the separation vessel is reduced to about −10° C. to reduce the solubility of the ammonium halide salt product in the unused ammonia;

f) removing the unused ammonia from the separation vessel and introducing into a capture vessel maintained at about −10° C. for reentry into the static reaction vessel; and g) increasing the temperature in the separation vessel to about 80° C. and removing the ammonium halide salt product from the separation vessel for introduction into the capture vessel and final removal thereof for disposal.

In a further aspect, the present invention provides for a system for sequentially separating ammonium halide salts from an ammonia solution formed during an ammonolysis process, the system comprising:

a separation vessel having an inlet for introducing an ammonium halide salt/ammonia solution and an outer surface, wherein at least a section of the outer surface is enclosed and/or in contact with heating and cooling coils to provide temperature changes from about −10° C. to about 80° C., wherein the temperature is reduced to about −10° C. and ammonium halide salt is precipitated in the separation vessel and ammonia is removed from the separation vessel, and wherein the temperature in the separation vessel is raised to about 80° C. for removing the ammonium halide salt from the separation vessel.

The above system may further comprise a capture vessel communicatively connected to the separation vessel for receiving ammonia removed from the separation vessel wherein the temperature within the capture vessel is about −10° C. and recovered ammonia can be reused in the ammonolysis process.

In yet another aspect, the present invention provides for a semi-continuous method of producing polysilazanes and separating same from unused ammonia and a waste salt product, the method comprising:

a) providing a ammonolysis reactor system comprising
   i) a static reactor vessel for introducing ammonia and at least one Si—H starting compound, wherein the static reactor vessel is a static mixer enclosed in a jacket to maintain an optimal temperature and pressure for the ammonolysis reaction;
   ii) a settling vessel communicatively connected to the static reaction vessel having an inlet for receiving an input of unused ammonia, ammonium halide salt and produced ammonolysis product, wherein the settling vessel is temperature control thereby allowing the produced ammonolysis product to settle to a lower layer in the settling vessel for removal thereof; and
   iii) a separation vessel communicatively connected to the settling vessel having an inlet for introducing an ammonium halide salt/ammonia solution and an outer surface, wherein at least a section of the outer surface is enclosed and/or in contact with heating and cooling coils to provide temperature changes from about −10° C. to about 80° C., wherein ammonium halide salt is precipitated and ammonia is removed from the separation vessel at a temperature of about −10° C.;

b) introducing ammonia and at least one Si—H starting compound into the reaction vessel and maintaining the optimal temperature and pressure for the production of polysilazanes;

c) moving the produced polysilazanes, unused ammonia and ammonium halide salt products from the reaction vessel and to the settling vessel, d) adjusting the temperature in the settling vessel for settling of the produced polysilazanes to a layer separate from that of the unused ammonia and ammonium halide salt product;

e) removing the unused ammonia and ammonium halide salt product from the settling vessel and introducing into the separation vessel, wherein the temperature in the separation vessel is reduced to about −10° C. to reduce the solubility of the ammonium halide salt product in the unused ammonia;

f) removing the unused ammonia from the separation vessel and introducing into a capture vessel maintained at about −10° C. for reentry into the reaction vessel; and g) introducing $CO_2$ into the separation vessel in an amount to bind with ammonium bound in the ammonium halide salt to form ammonium carbamate and removing from the separation vessel for final disposal or reuse in fertilizers or recycling.

Various other aspects, features and embodiments of the invention will be more fully apparent from the ensuing disclosure and appended claims.

DETAILED DESCRIPTION OF THE INVENTION

For purposes of this invention, the terms and expressions appearing in the specification and claims, are intended to have the following meanings.

"Silazane" as used herein means monomers, oligomers, cyclic and linear polymers having one to four Si—N repeating units in the compound.

"Polysilazane" as used herein means oligomers, cyclic, polycyclic, linear polymers or resinous polymers and denotes a compound which includes one or more Si—N units in which the nitrogen atoms are bonded to at least two silicon atoms. Polysilazane is transformed into silica or a silica material when heated, in which the silica material is used for electric and electronic applications, such as an insulating layer, owing to excellent insulating properties thereof. Polysilazanes can be prepared from a variety of starting compounds by various methods. Polysilazanes obtained from ammonia is generally known as an ammonolysate, and one obtained from an amino compound containing an $NH_2$ group except for ammonia is known as an aminolysate. Polysilazanes are generally prepared by a process of reacting chlorosilanes ($SiCl_4$, $HSiCl_3$ and $H_2SiCl_2$) with ammonia. By "oligomer" is also intended to mean a molecule or chemical compound comprising several repeat units, generally from about 2 to 10 repeat units. "Polymer", as used herein, means a molecule or compound which comprises a large number of repeat units, generally greater than about 10 repeat units.

"Ammonolysis products" as used herein is at least one member selected from the group including silazanes, polysilazanes, aminosilanes, organosilazanes, organopolysilazanes and mixtures thereof.

"Si—H starting compounds" as used herein is at least one member selected from the group including halosilanes, organohalosilanes, silazanes and/or polysilazanes, all of which have at least one Si—H bond.

"Halosilane" used as a Si—H bond-containing starting compound has at least one Si—H bond. Any mono-, di- or tri-halogenated silane may be used.

Figure 1:
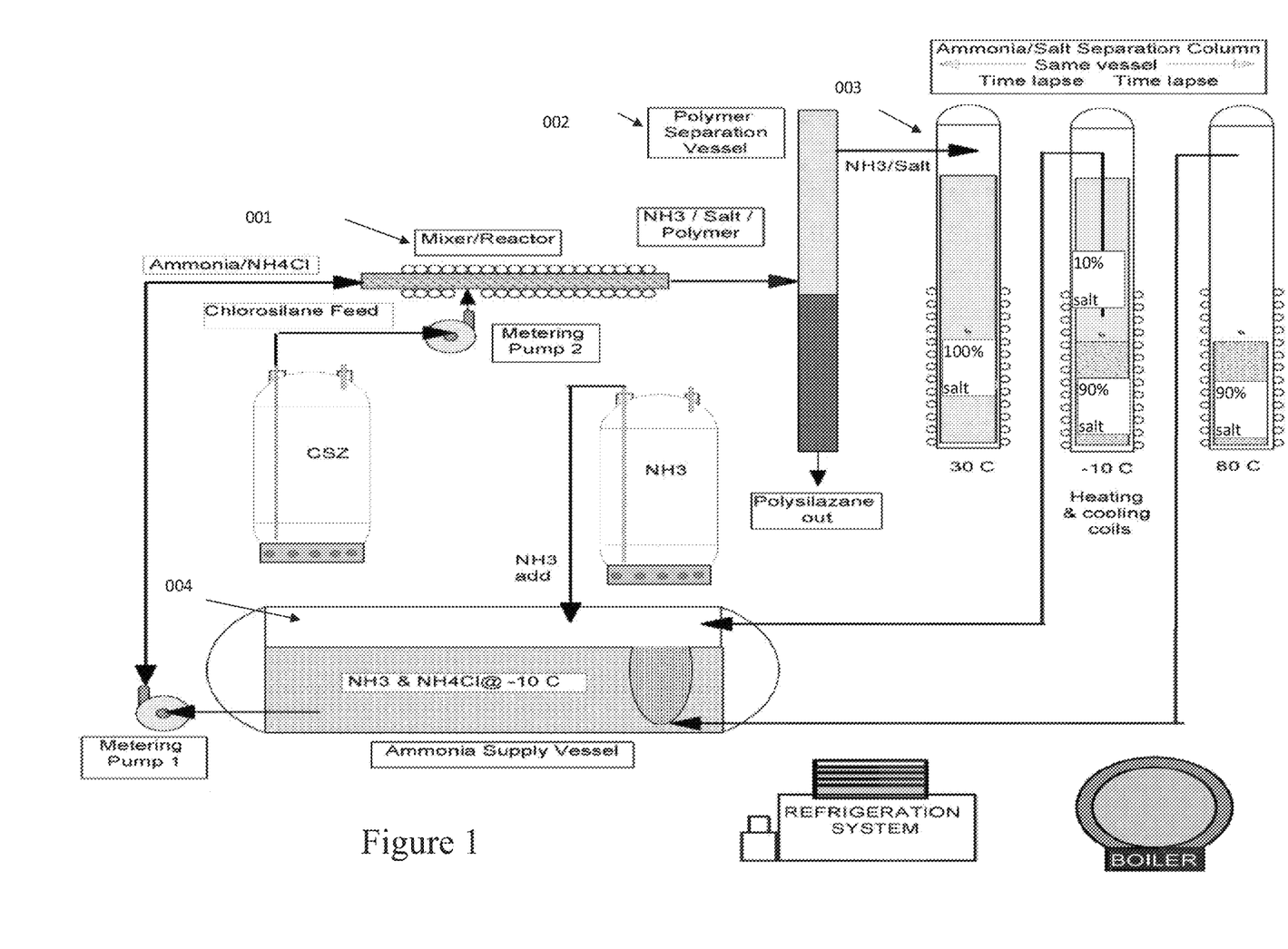
FIG. 1 shows a static mixer system for semi-continuous production.

FIG. 1 shows the steps and system components to prepare polysilazane compounds. To prepare polysilazane compounds according to the present invention, any mono-, di- or tri-halogenated silane may be used. The halosilane utilized as a Si—H bond containing starting compound in the present methods may be selected from the group consisting of $RSiX_3$, $R_2SiX_2$, $R_3SiX$, and mixtures thereof where R may be the same or different, is a hydrogen atom, a lower alkyl group having 1 or more carbons atoms, a substituted or unsubstituted cycloalkyl group having 3 or more carbon atoms, a substituted or unsubstituted lower alkenyl group having 2 or more carbon atoms, or a substituted or unsubstituted lower aryl group having 6 or more carbon atoms, with the proviso that at least one R is a hydrogen atom, and X is a halogen. Specifically, examples of suitable organohalosilanes include, dichlorosilane, methyl dichlorosilane, dimethyl chlorosilane, diethyl chlorosilane, ethyl dichlorosilane, ethyl dibromosilane, ethyl diiodosilane, ethyl difluorosilane, dichloro monofluorosilane, propyl dibromosilane, iso-propyl dichlorosilane, butyl diiodosilane, n-propyl dichlorosilane, dipropyl chlorosilane, trichlorosilane, n-butyl dichlorosilane, iso-butyl dichlorosilane, iso-amyl dichlorosilane, benzyl dichlorosilane, naphtyl dichlorosilane, propenyl dichlorosilane, phenyl dichlorosilane, diphenyl chlorosilane, methyl ethyl chlorosilane, vinyl methyl chlorosilane, phenyl methyl chlorosilane, dibenzyl chlorosilane, p-chlorophenyl silicon dichloride, n-hexyl dichlorosilane, cyclohexyl dichlorosilane, dicyclohexyl chlorosilane, di-isobutyl chlorosilane, para-tolyl dichlorosilane, di-paratolyl chlorosilane, para-styryl dichlorosilane, ethynyl dichlorosilane and mixtures thereof.

The selected halosilane or mixtures thereof are introduced directly into and reacted with anhydrous liquid ammonia in reaction vessel (001). The halosilane may be introduced into the anhydrous liquid ammonia in a controlled stream, either continuously or periodically, to prevent overheating of the reaction mixture due to the exothermic ammonolysis reaction.

The temperature and/or pressure in the static reaction vessel preferably be within a range to maintain the anhydrous ammonia in either a vapor or liquefied state. The pressure range will be dependent upon the temperature generated by the reaction and whether the reaction vessel is being cooled by an outside cooling source. Preferably, the pressure is controlled and maintained between about 5 psi and about 200 psi and the temperature between a range of about −30° C. and about 50° C. during the ammonolysis reaction. Such control of the pressure and temperature provides a more uniform and consistent product over a product run and from one product run to another run.

Introducing the halosilanes into a stoichiometric excess of liquid anhydrous ammonia relative to the amount of Si—X bonds is very important because the ammonium halide salt formed during the reaction is solubilized in the liquid ammonia phase, and as such, does not precipitate with or into the prepared ammonolysis products but instead remains in a liquid layer distinct from another liquid layer comprising the prepared ammonolysis products. This is in contrast to the processes hitherto known for the manufacture of silazanes wherein precipitated ammonium halide had to be filtered off and the product washed several times to avoid losses. Advantageously, the separation process according to the present invention need not include separating ammonium halide salt from the preferred ammonolysis products.

Further, the addition of an inert solvent is not required because the ammonium halide salt is solubilized in an excess of liquid ammonia instead of precipitating into the novel ammonolysis products. Additionally, the Si—H bond containing starting compounds do not need to be dissolved in an inert solvent before introduction into the anhydrous liquid ammonia thereby eliminating the necessity for separating the solvent from the ammonolysis products.

Although merely a theory it is believed the lack of an inert solvent in the reaction mixture allows silazanes and/or polysilazanes, that may still contain a Si—H bond, to be retained in the ionic and acidic environment for a sufficient time to stabilize to a linear structure for further ammonolysis and/or polymerization.

In some situations depending on the Si—H bond containing starting compounds, an inert solvent may be used in the methods of the present invention and if so any organic solvent that does not react with the silanes, silazanes, and polysilazanes or interferes and/or participates in the ammonolysis process may be added, including but not limited to benzene, toluene, xylene, pentane, tetrahydrofuran and the like.

As shown in FIG. 1, the present invention provides for a semi-continuous, rather than batch, processing system, wherein a solution of ammonium chloride and ammonia flows through a jacketed static mixer (001) in place of a conventional reactor and settling tank. The jacketed static mixer (001), acting as a reactor vessel, will serve as the mixer and will allow a constant ammonolysis temperature to be maintained during product formation. Heat extracted from the static mixer can be recovered to assist in boiling ammonia off the saturated solution. In theory, the ammonolysis step could be continuous, but from a practical standpoint, it is limited by the ammonia recovery/salt removal operation which is limited by the necessity of removing a solid from a pressurized system.

During the course of the ammonolysis reaction, there may be an increase in temperature in the reaction vessel due to the exothermic reaction. As the temperature increases in the reaction vessel, there may be a tendency for the reaction to overheat and the addition rate may have to be reduced. By reducing the amount of Si—H bond containing starting compound being introduced over a period of time, the heat generated within the vessel may be controlled. Further, it should be noted that the present invention provides a jacket on the static reaction vessel that can control the environment within the vessel including temperature, pressure, humidity, flow speed, vibrations, etc.

The present invention provides a static reactor vessel (001) which requires no moving parts, a reactor vessel which allows precision control of reaction processing parameters including temperature, pressure, and flow rate. The present invention differs from prior approaches in that no rotating stirrer is required. Mixing is accomplished in a jacketed static mixer capable of withstanding the temperature and pressure associated with the desired reaction. In addition, the jacket provides a mechanism for adjusting the process reaction temperature; adding heat, if necessary, or chilling the reaction, if desired.

In the present invention, a settling column (002) receives the ammonia/salt/polymer mixture and controls the temperature of the materials to optimize settling of the polymer while extracting ammonia/salt solution from the top of the column for entry into a separation vessel (003), with a column-type shape, with temperature controlling coils on at least a section of the separation vessel which chills the ammonia/salt solution to the desired amount of ammonium chloride precipitates out, at which point, the supernatant is drawn off to the ammonia storage/supply vessel sufficiently chilled so as to be ready for entry into the static reactor (static mixer). As quickly as the supernatant is removed, the tank chilling coils reverse to heating mode and any residual ammonia in the column and the ammonium chloride is vaporized and forced into the ammonia storage/supply vessel (004) where it condenses and becomes another part of the working ammonia. At this point, the ammonium chloride is removed as a clean, disposable solid salt.

It is known that ammonium chloride's solubility in ammonia is highly temperature sensitive and that it is possible to remove as much as 90% of the salt from a saturated solution at 30° C. (86° F.) by dropping the temperature to −10° C. (14° F.). One method of separating ammonia from the salt is evaporation and distillation. However, this approach is energy intensive and relatively slow.

Figure 2:
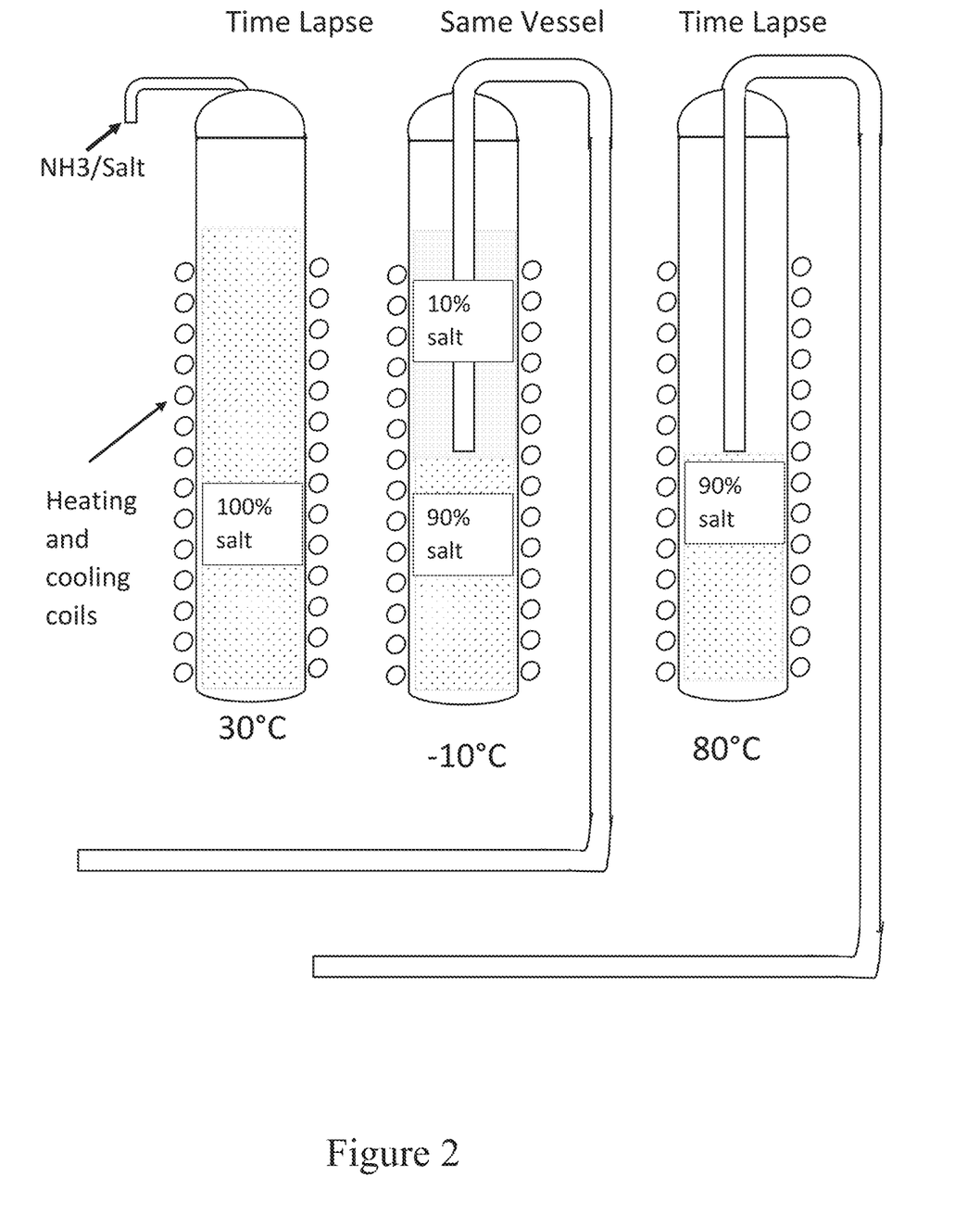
FIG. 2 shows a sequential process for salt and ammonia recovery.

Conveniently, the KiON process described U.S. Pat. Nos. 6,329,487 and 7,033,562 benefits from the presence of a certain amount of ammonium chloride in the ammonia during the ammonolysis stage, so recovered ammonia need not be totally salt-free. As a result, the present invention provides a scheme whereby 90% of the waste salt is removed from the ammonia/salt solution renders the ammonia suitable for return to the ammonia supply tank and subsequently, the ammonolysis reactor. In FIG. 2, saturated ammonia/salt solution is separated from the polysilazane resin by standard settling and decanting techniques. The ammonium chloride saturated solution is transferred to the separation vessel (003) which is at a summer ambient temperature of 30° C.

The separation vessel and its contents are then chilled to roughly −10° C. as shown in the center column, (which is merely the same (003) column but at a later time) where a substantial portion of the ammonium chloride precipitates out.

When the solution has reached the desired temperature and the desired amount of ammonium chloride has precipitated out, ammonia liquid is drawn out of the vessel by the dip tube and transferred to the ammonia supply tank (004 shown in FIG. 1) to await reuse in the ammonolysis process.

Once the low concentration salt/ammonia solution is removed from the column, the chilling coils are transferred to the heating phase and ammonia in the vessel is evaporated in vapor phase and transferred into the ammonia supply tank where it condenses to liquid in the cold ammonia/salt solution. Once the ammonia is evaporated out, only a dry ammonium chloride salt remains which can easily be removed for disposal. Conveniently, the ammonia in the ammonia supply tank (004) is quite cold and more suitable for the exothermic ammonolysis stage.

Specifically, as shown in FIG. 1, a solution of chilled (≈−10° C.) anhydrous liquid ammonia and ammonium chloride is brought from the Ammonia Supply Vessel (004) by way of Metering Pump 1 to the Mixer/Reactor (001)—a jacketed static reactor—where it is met by a flow of chlorosilane feed from the chlorosilane holding tank (CSZ) which is introduced into the Mixer/Reactor by Metering Pump 2.

As the ammonia, ammonium chloride, and the chlorosilane feed pass through the Mixer/Reactor, they are intimately mixed and reacted to form polysilazane resin (Polymer). During this process, a good deal of heat is released due to the highly exothermic nature of the reaction. This heat is extracted by the cooling coils shown on the Mixer/Reactor exterior which are cooled by the Refrigeration System. In this manner, both the temperature and the pressure within the Mixer/Reactor are maintained at a steady level.

Upon exiting the Mixer/Reactor, the slurry of ammonia ($NH_3$), ammonium chloride "salt" ($NH_4Cl$), and polysilazane (Polymer) enter the Polymer Separation Vessel (002). Because of the heavy concentration of ammonium chloride in the ammonia, the polysilazane (which is normally ammonia-soluble) is "salted out" (precipitated) and because it is heavier than the ammonia/salt solution, the Polymer settles to the bottom of the Polymer Separation Vessel, where it is easily drained out and collected.

In one method, the lighter ammonia/salt fraction is transferred to an Ammonia/Salt Separation Column (003) which is equipped with heating and cooling coils. In this column, the ammonia/salt solution is chilled from room temperature to ≈−10° C. causing a large portion of the salt to precipitate out of the ammonia. The chilled ammonia, depleted of roughly 90% of its ammonium chloride, is then transferred to the Ammonia Supply Vessel (004).

At this point, the Ammonia/Salt Separation Column is switched from cooling to heating mode, courtesy of the boiler and the remaining, highly-concentrated ammonia-salt brine is heated to ≈80° C.—driving the remaining ammonia off as vapor and allowing it to transfer into the Ammonia Supply Vessel where it condenses into the solution. The Ammonia/Salt Separation Column is purged with air at atmospheric pressure through an ammonia scrubber (not shown). The remaining salt is now a dry, caked powder which can be removed with a screw auger and lock hopper (neither shown).

Figure 3:
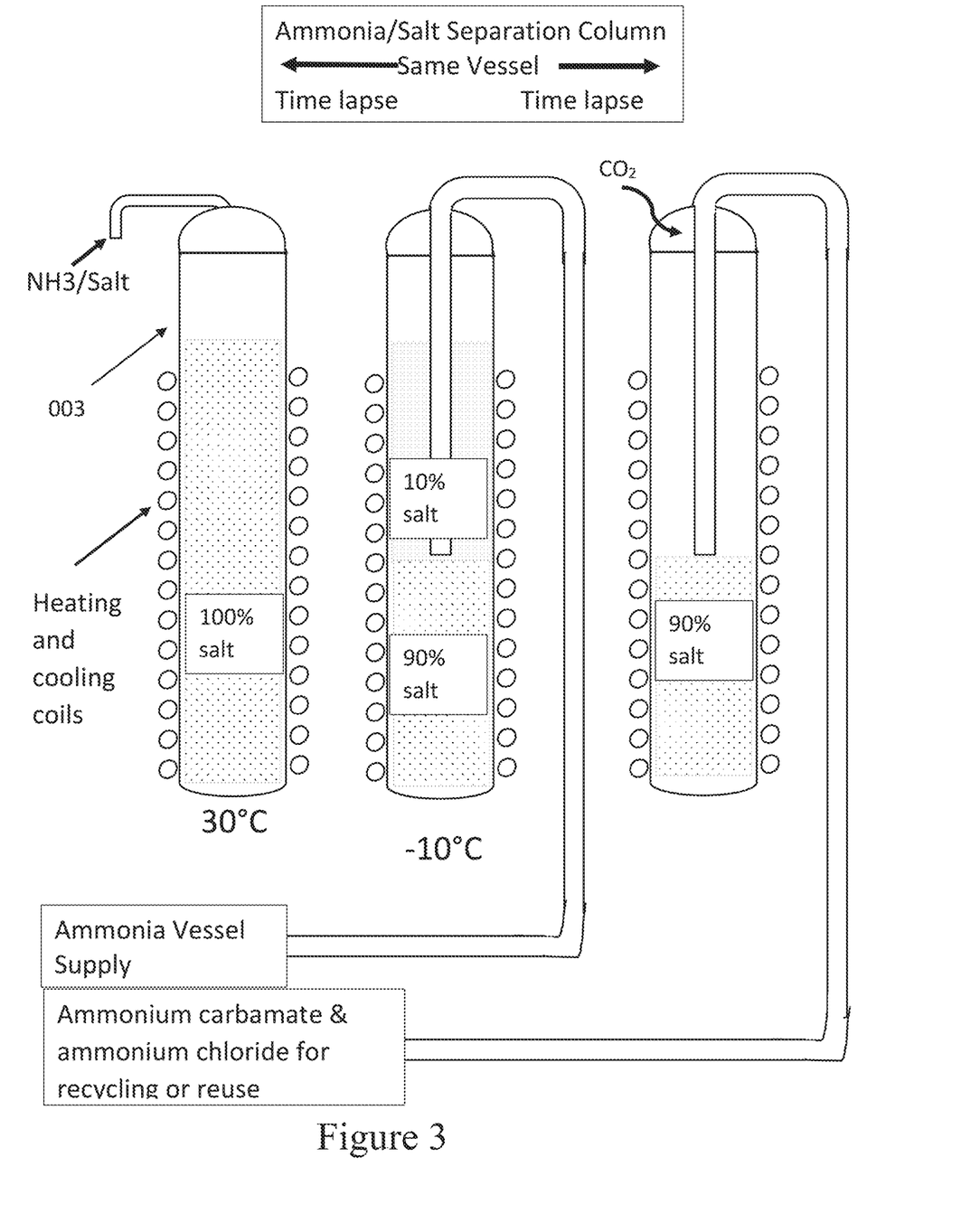
FIG. 3 shows a sequential process for salt and ammonia recovery using $CO_2$ in the separation process.

In a further step, ammonia/salt fraction remaining can be separated by an effective separation process using $CO_2$. Specifically, carbon dioxide is injected into the ammonia/salt sludge as shown in FIG. 3. Carbon dioxide, when injected, reacts with ammonia, to form ammonium carbamate. By injecting an approximately stoichiometric amount of carbon dioxide to ammonia, ammonia or ammonia salts can be effectively converted to ammonium carbamate, surprising even the ammonia trapped within the ammonium chloride salt. While not wishing to be bound to any specific theory, it is believed that as the carbon dioxide penetrates the ammonia-containing ammonium chloride salt, the salt is broken apart and rendered more easily removed from a reactor vessel. This separation could be related to a higher affinity of ammonia to $CO_2$ relative to Cl. It is taught that the reaction between ammonia and carbon dioxide is exothermic-between 36,670 and 46,090 cal./g. mole (145-183 btu). This heat of formation serendipitously becomes available to further encourage vaporization of any remaining free ammonia residing in the salt. Further, no temperature control is necessarily required on vessel (003) because of the heat formed in the reacrion The resulting waste product comprises ammonium chloride and ammonium carbamate, two benign salts which can either be landfilled, used as fertilizer or utilized as road salt.

Ammonium carbamate is the inorganic compound with the formula $NH_4[H_2NCO_2]$. This salt is formed by the reaction of ammonia with carbon dioxide and is a white solid that is extremely soluble in water.

Ammonium carbamate reverts to carbon dioxide and ammonia even as a solid: $NH_2CO_2NH_4 \rightarrow 2NH_3+CO_2$. As such, the ammonium carbamate can be separate wherein the ammonia can be recaptures. In the alternative, when used as a solid fertilizer the soil captures the $CO_2$ and uses the nitrogen containing ammonium. It takes approximately about 2.59 pounds of $CO_2$ to treat about 1 pound of ammonia. At less than $0.01/pound, carbon dioxide will cost roughly $0.025 for each pound of ammonia neutralized. Use of $CO_2$ in the separation provides the following benefits:

Low cost;
Ease of application;
Facilitated waste disposal
"Conditions" salt removal from reactor;
Safe;
Benign waste products;
Ammonium chloride can be separated by the natural dissociation of the carbamate;
Speeds up production process; and
Ammonium carbamate can be recovered from the ammonium chloride for use as fertilizer by warming the salt mix and condensing carbamate on a cooler surface, possibly in an agricultural scale.

The methods of the present invention may be carried out in both a batch and continuous mode. During a continuous process, the ammonolysis products may be withdrawn from their liquid-phase layer. This removal of prepared ammonolysis products may occur after an initial production of a sufficient amount of product to facilitate withdrawal of same from the liquid-phase layer without removing the liquid layer comprising the ammonia and ammonium halide salt.

The polysilazanes of the present invention are useful as fibers, filaments, flakes, powder, films, coatings, and the like, as well as other products such as mats, woven fabric, slabs, sleeves, structural composites, etc. Such shaped articles, because of their chemical composition, represent a material which is oxidation-resistant up to high temperature. Their good physical properties and excellent mechanical strength make them suitable for the lining of parts of apparatuses to be protected against corrosion and oxidation at high temperatures, while foams of such materials can be used very advantageously as temperature-resistant insulating materials. Various shaped articles of silicon nitride such as pipes, crucibles, bricks or the like are suitable for use as high temperature materials because of their good chemical resistance.

That which is claimed is:

1. An ammonolysis reactor system for producing polysilazanes and subsequent removal of unused ammonia and ammonium halide salt, the reactor system comprising:
   a) a static reactor vessel for introducing ammonia and at least one Si—H group-containing, wherein the static reactor vessel is a static mixer enclosed in a jacket to maintain an optimal temperature and pressure for the ammonolysis reaction;
   b) a settling vessel communicatively connected to the static reaction vessel having an inlet for receiving an input of unused ammonia, ammonium halide salt and produced ammonolysis product, wherein the produced ammonolysis product settles to a lower layer in the settling vessel for removal thereof; and
   c) a separation vessel communicatively connected to the settling vessel having an outer surface, wherein at least a section of the outer surface of the separation vessel is enclosed and/or in contact with heating and cooling coils to provide temperature changes over a range of from about −10° C. to about 80° C., wherein the waste ammonium halide salt is precipitated and ammonia is removed from the separation vessel at a temperature of about −10° C.

2. The ammonolysis reactor system according to claim 1, further comprising a capture vessel communicatively connected to both the separation vessel and static reaction vessel for receiving ammonia removed from the separation vessel.

3. The ammonolysis reactor system according to claim 2, wherein the temperature within the capture vessel is about −10° C. and recovered ammonia can be reused in the ammonolysis process in the reaction vessel.

4. The ammonolysis reactor system according to claim 1, wherein the ammonia is anhydrous liquid ammonia.

5. The ammonolysis reactor system according to claim 1, wherein the at least one Si—H group-containing starting compound is a halosilane selected from the group consisting of $RSiX_3$, $R_2SiX_2$, $R_3SiX$, and mixtures thereof where R may be the same or different, is a hydrogen atom, a lower alkyl group having 1 or more carbons atoms, a substituted or unsubstituted cycloalkyl group having 3 or more carbon atoms, a substituted or unsubstituted lower alkenyl group having 2 or more carbon atoms, or a substituted or unsubstituted lower aryl group having 6 or more carbon atoms, with the proviso that at least one R is a hydrogen atom, and X is a halogen.

6. The ammonolysis reactor system according to claim 5, wherein the halogen is selected from the group of fluorine, iodine, chlorine and bromine.

7. A semi-continuous method of producing polysilazanes and separating same from unused ammonia and a waste salt product, the method comprising:
   a) providing an ammonolysis reactor system comprising
      i) a static reactor vessel for introducing ammonia and at least one Si—H group-containing, wherein the static reactor vessel is a static mixer enclosed in a jacket to maintain an optimal temperature and pressure for the ammonolysis reaction;
      ii) a settling vessel communicatively connected to the static reaction vessel having an inlet for receiving an input of unused ammonia, ammonium halide salt and produced ammonolysis product, wherein the settling vessel is temperature control thereby allowing the produced ammonolysis product to settle to a lower layer in the settling vessel for removal thereof; and
      iii) a separation vessel communicatively connected to the settling vessel having an inlet for introducing an ammonium halide salt/ammonia solution and an outer surface, wherein at least a section of the outer surface is enclosed and/or in contact with heating and cooling coils to provide temperature changes over a range of from about −10° C. to about 80° C., wherein ammonium halide salt is precipitated and ammonia is removed from the separation vessel at a temperature of about −10° C.;
   b) introducing ammonia and at least one Si—H group-containing into the reaction vessel and maintaining the optimal temperature and pressure for the production of polysilazanes;
   c) moving the produced polysilazanes, unused ammonia and ammonium halide salt products from the reaction vessel into the settling vessel,
   d) adjusting the temperature in the settling vessel for settling of the produced polysilazanes to a layer separate from that of the unused ammonia and ammonium halide salt product;
   e) removing the unused ammonia and ammonium halide salt product from the settling vessel and introducing into the separation vessel, wherein the temperature in the separation vessel is reduced to about −10° C. to reduce the solubility of the ammonium halide salt product in the unused ammonia;
   f) removing the unused ammonia from the separation vessel and introducing into a capture vessel maintained at about −10° C. for reentry into the reaction vessel; and
   g) increasing the temperature in the separation vessel to about 80° C. and removing the ammonium halide salt product from the separation vessel for introduction into the capture vessel and final removal thereof for disposal.

8. The semi-continuous method according to claim 7, further comprising a capture vessel communicatively connected to both the separation vessel and static reaction vessel for receiving ammonia removed from the separation vessel.

9. The semi-continuous method according to claim 8, wherein the temperature within the capture vessel is about −10° C. and recovered ammonia can be reused in the ammonolysis process in the reaction vessel.

10. The semi-continuous method according to claim 7, wherein the ammonia is anhydrous liquid ammonia.

11. The semi-continuous method according to claim 7, wherein the at least one Si—H group-containing is a halosilane selected from the group consisting of $RSiX_3$, $R_2SiX_2$, $R_3SiX$, and mixtures thereof where R may be the same or different, is a hydrogen atom, a lower alkyl group having 1 or more carbons atoms, a substituted or unsubstituted cycloalkyl group having 3 or more carbon atoms, a substituted or unsubstituted lower alkenyl group having 2 or more carbon atoms, or a substituted or unsubstituted lower aryl group having 6 or more carbon atoms, with the proviso that at least one R is a hydrogen atom, and X is a halogen.

12. The semi-continuous method according to claim 11, wherein the halogen is selected from the group of fluorine, iodine, chlorine and bromine.

13. A semi-continuous method of producing polysilazanes and separating same from unused ammonia and a waste salt product, the method comprising:
   a) providing an ammonolysis reactor system comprising
      i) a static reactor vessel for introducing ammonia and at least one Si—H group-containing, wherein the static reactor vessel is a static mixer enclosed in a jacket to maintain an optimal temperature and pressure for the ammonolysis reaction;
      ii) a settling vessel communicatively connected to the static reaction vessel having an inlet for receiving an input of unused ammonia, ammonium halide salt and produced ammonolysis product, wherein the settling vessel is temperature control thereby allowing the produced ammonolysis product to settle to a lower layer in the settling vessel for removal thereof; and
      i) a separation vessel communicatively connected to the settling vessel having an inlet for introducing an ammonium halide salt/ammonia solution and an outer surface, wherein at least a section of the outer surface is enclosed and/or in contact with heating and cooling coils to provide temperature changes from about −10° C. to about 80° C., wherein ammonium halide salt is precipitated and ammonia is removed from the separation vessel at a temperature of about −10° C.;
   b) introducing ammonia and at least one Si—H group-containing into the reaction vessel and maintaining the optimal temperature and pressure for the production of polysilazanes;
   c) moving the produced polysilazanes, unused ammonia and ammonium halide salt products from the reaction vessel into the settling vessel, d) adjusting the temperature in the settling vessel for settling of the produced polysilazanes to a layer separate from that of the unused ammonia and ammonium halide salt product;

e) removing the unused ammonia and ammonium halide salt product from the settling vessel and introducing into the separation vessel, wherein the temperature in the separation vessel is reduced to about −10° C. to reduce the solubility of the ammonium halide salt product in the unused ammonia;

f) Removing the unused ammonia from the separation vessel and introducing into a capture vessel maintained at about −10° C. for reentry into the reaction vessel; and g) introducing $CO_2$ into the separation vessel in an amount to bind with ammonium bound in the ammonium halide salt to form ammonium carbamate and removing from the separation vessel for final disposal or reuse in fertilizers or recycling.

14. The semi-continuous method according to claim 13, further comprising a capture vessel communicatively connected to both the separation vessel and static reaction vessel for receiving ammonia removed from the separation vessel.

15. The semi-continuous method according to claim 14, wherein the temperature within the capture vessel is about −10° C. and recovered ammonia can be reused in the ammonolysis process in the reaction vessel.

16. The semi-continuous method according to claim 13, wherein the ammonia is anhydrous liquid ammonia.

17. The semi-continuous method according to claim 13, wherein the at least one Si—H group-containing is a halosilane selected from the group consisting of $RSiX_3$, $R_2SiX_2$, $R_3SiX$, and mixtures thereof where R may be the same or different, is a hydrogen atom, a lower alkyl group having 1 or more carbons atoms, a substituted or unsubstituted cycloalkyl group having 3 or more carbon atoms, a substituted or unsubstituted lower alkenyl group having 2 or more carbon atoms, or a substituted or unsubstituted lower aryl group having 6 or more carbon atoms, with the proviso that at least one R is a hydrogen atom, and X is a halogen.

18. The semi-continuous method according to claim 17, wherein the halogen is selected from the group of fluorine, iodine, chlorine and bromine.

* * * * *